United States Patent
Moellmann et al.

(10) Patent No.: US 7,045,772 B2
(45) Date of Patent: *May 16, 2006

(54) DEVICE AND METHOD FOR CONTROLLING THE OPTICAL POWER IN A MICROSCOPE

(75) Inventors: Kyra Moellmann, Trippstadt (DE); Holger Birk, Meckesheim (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 9 days.

This patent is subject to a terminal disclaimer.

(21) Appl. No.: 10/853,991

(22) Filed: May 26, 2004

(65) Prior Publication Data

US 2004/0238719 A1 Dec. 2, 2004

Related U.S. Application Data

(60) Provisional application No. 60/544,207, filed on Feb. 12, 2004.

(30) Foreign Application Priority Data

May 27, 2003  (DE)  ................. 103 24 331

(51) Int. Cl.
*H01J 3/14* (2006.01)
*H01J 40/14* (2006.01)
*H01J 5/16* (2006.01)

(52) U.S. Cl. .......... 250/234; 250/201.3; 359/368
(58) Field of Classification Search ............ 250/201.3, 250/234–236; 359/368–398
See application file for complete search history.

(56) References Cited

U.S. PATENT DOCUMENTS

| 6,355,919 | B1 | 3/2002 | Engelhardt | 250/201.3 |
| 6,686,583 | B1 | 2/2004 | Engelhardt | 250/216 |
| 2002/0003204 | A1 | 1/2002 | Engelhardt | 250/216 |
| 2002/0097487 | A1* | 7/2002 | Arai | 359/385 |
| 2004/0169134 | A1* | 9/2004 | Knebel et al. | 250/234 |

FOREIGN PATENT DOCUMENTS

| DE | 19827140 | 12/1999 |
| DE | 199 06 763 A1 | 8/2000 |
| DE | 100 33 269 A1 | 1/2002 |
| DE | 10137155 | 2/2003 |
| DE | 101 42 945 A1 | 4/2003 |

* cited by examiner

*Primary Examiner*—Stephone B. Allen
*Assistant Examiner*—Patrick J. Lee
(74) *Attorney, Agent, or Firm*—Davidson, Davidson & Kappel, LLC

(57) ABSTRACT

An apparatus for controlling optical power in a microscope includes a measuring device for measuring the optical power, and a control unit for controlling a high-frequency source as a function of the measured optical power so as to achieve a selectable level of the optical power. The microscope includes a source providing light along an illumination beam path to a sample, a detector receiving detection light lead along a detection beam path from the sample, and an acousto-optical or electro-optical element located in the illumination beam path and driven by the high-frequency source.

35 Claims, 1 Drawing Sheet

DEVICE AND METHOD FOR CONTROLLING THE OPTICAL POWER IN A MICROSCOPE

Priority is claimed to U.S. provisional application 60/544,207 filed on Feb. 12, 2004 and to German patent application DE 103 24 331.3, the subject matters of both of which are hereby incorporated by reference herein.

The present invention relates to a device and a method for controlling the optical power in a microscope, in particular, in a confocal laser scanning microscope, including at least one light source, an illumination beam path leading the light to a sample, a detector, a detection beam path leading the detection light from the sample to the detector, and further including an acousto-optical or electro-optical element in the illumination beam path.

BACKGROUND

Devices and methods for controlling the optical power in a microscope are known in the field. In the devices of the type described, fast acousto-optical or electro-optical elements are generally used to adjust the optical power of an illuminating light beam in a nearly infinitely variable and spectrally selective manner. The optical elements used here are primarily AOTF (acousto-optical tunable filter) crystals which allow the optical power of a laser used as a light source in a microscope to be controlled for each wavelength. To this end, generally, an RF frequency corresponding to the desired laser wavelength and a corresponding amplitude of the RF wave are applied to the AOTF crystal via a control unit.

The operating principle of an AOTF crystal is based on the fact that, for example, the RF frequency applied to the crystal acts as an optical grating for a laser beam incident perpendicular to the RF frequency, allowing the incident laser light to be diffracted into the first order maximum in a nearly completely collinear manner, and thus to be provided as an illuminating light beam. By linear superposition of different RF frequencies, laser light of different wavelengths can be collinearly diffracted and picked off with different intensities at the AOTF.

A crucial parameter of acousto-optical elements is the sound velocity, i.e., the velocity at which the RF wave applied to the crystal propagates in the crystal. A change in the sound velocity results in a change in the diffraction efficiency of the crystal, i.e., the laser wavelength diffracted with maximum intensity is shifted in frequency.

A device of the type described is known, in particular, from German Patent DE 198 27 140 C2. The laser scanning microscope described therein has also an AOTF crystal provided in the input laser beam path for spectrally selective adjustment of the optical power of the illuminating light beam. Since the sound velocity in the AOTF crystal is temperature-dependent, a temperature sensor is provided in the vicinity of the crystal, the temperature sensor registering the temperature as a measuring signal. To maintain the optical illumination power constant, it is proposed there as a first measure to maintain the AOTF crystal at a constant temperature using heating control means. As an alternative measure, it is proposed to control the AOTF frequency via a control unit as a function of the detected temperature to thereby correct a change in the optical power of the illuminating light beam resulting from the temperature change.

To carry put such a correction, calibration curves are needed from which can be derived the relationship between a change in the temperature of the crystal and a resulting change in the diffraction efficiency or a shift in frequency of the optimally diffracted laser wavelength.

This method has the problem that, on the one hand, it only relies on the correctness of the underlying calibration curve and, on the other hand, that measuring errors in the calibration curves will propagate. Moreover, its use in practice is extremely inflexible because a new calibration curve must first be generated for each illumination wavelength.

A further problem is that the actual crystal temperature can only be measured with a delay in time. Due to the dimensions of the crystal, the time constant is typically several minutes. However, due to the absorption of the RF power in the crystal, the temperature can also change on a shorter time scale so that inaccuracies may creep in this manner as well.

SUMMARY OF THE INVENTION

It is therefore an object of the present invention to provide a device and a method for controlling the optical power in a microscope, in particular, in confocal laser scanning microscope, whereby the optical power of the illuminating light beam of a microscope can be easily adjusted with high precision in a spectrally selective manner and, in particular, maintained constant.

The present invention provides an apparatus for controlling optical power in a microscope, where the microscope includes at least one light source configured to provide light along an illumination beam path to a sample; a detector configured to receive detection light lead along a detection beam path from the sample; and an acousto-optical or electro-optical element disposed in the illumination beam path and configured to be driven by a high-frequency source. The apparatus includes a measuring device configured to measure the optical power; and a control unit configured to control the high-frequency source as a function of the measured optical power so as to achieve a selectable level of the optical power.

In accordance with the present invention, it was discovered, first of all, that control of the optical power as a function of the temperature prevailing at the acousto-optical element is highly error-prone. In a next step, it was found that these errors can be avoided by a more direct procedure, i.e., by detecting the optical power itself instead of the temperature as an indirect parameter. The acousto-optical or electro-optical element can be operated by a control unit as a function of the measured optical power in such a manner that the optical power assumes a desired value. This allows the optical power to be controlled with high precision.

From a design standpoint, the measuring device could, in general terms, be placed at any position in illumination beam path.

Advantageously, the measuring device could be placed between a scanning optical system and a tube optical system in the plane of an intermediate image. In this connection, the measuring device could be able to be rotated into the area of the actual image field in the plane of the intermediate image. However, it is also conceivable to place the measuring device outside the actual image field at the edge of the intermediate image, it being possible for such a configuration to be a fixed configuration.

Particularly precise control of the optical power is possible when placing the measuring device directly upstream of the sample. By positioning the measuring device in this manner, it is possible to eliminate nearly all sources of error that occur along the illumination beam path and which can affect the optical power on the sample. The error sources to be mentioned in this connection are, in particular, the beam splitters or the deflection mirrors, which are generally provided with vapor-deposited, polarization-dependent coatings. Specifically, the optical power can thus be stabilized to below 1% change. It is also possible, in particular, to compensate for the non-linear properties of a piezoelectric transducer that is used to couple the RF wave into the acousto-optical crystal.

When examining transparent samples, it is also conceivable to place the measuring device downstream of the sample.

If the samples to be examined are insensitive, and the requirements placed on the measurement are primarily to maintain constant the optical power incident on the detector, then the measuring device could even be placed in the detection beam path.

The measuring device can have detection means that are used to measure the optical power. Specifically, the detection means can be photodiodes. Especially when measuring short-time fluctuations of the optical power, it is suitable to use monitoring diodes.

In addition to the detection means, the measuring device could also have reference patterns. These reference patterns could, for example, be in the form of a grating or lines and used for calibration, in particular, for linearity calibration.

Alternatively, or in addition to placing a measuring device in the illumination beam path, it would also be possible to provide a measuring device outside the illuminating beam path, the illuminating and/or the detection light beam being reflected onto the measuring device via an optical means for preferably permanently reflecting out a reference beam.

The microscope may include a beam combiner which allows light of different wavelengths, i.e. in particular the light of several different lasers, to be combined into an illuminating light beam in a manner known per se. To select specific wavelengths and to adjust the optical power in a nearly infinitely variable and spectrally selective manner, it would be possible to place the acousto-optical or electro-optical element downstream of the beam combiner. As already described, the optical power can be controlled in a spectrally selective manner as a function of the optical power measured by the measuring device.

The acousto-optical element used can be, in particular, an AOTF (acousto-optical tunable filter), an AOBS (acousto-optical beam splitter), or an AOM (acousto-optical modulator).

The electro-optical element used could be an EOM (electro-optical modulator). In this case, the voltage applied to the crystal can be controlled directly.

Particularly advantageously, the RF frequency and/or the RF amplitude of the high-frequency and/or voltage source driving the acousto-optical or electro-optical element could be adjustable in a nearly infinitely variable manner. If the measured optical power deviates from the desired value, the optical power could then be corrected with high precision in a spectrally selective manner by controlling the RF frequency and/or the RF amplitude.

In addition to the above-described acousto-optical and electro-optical element, which is placed downstream of the beam combiner to select specific wavelengths in the illuminating light beam, it would also be possible to provide further acousto-optical and/or electro-optical elements. These elements could also be controllable as a function of the optical power measured by the measuring device. These additional acousto-optical and/or electro-optical elements could be used in a well-known manner to spatially separate the illuminating light beam and the detection light beam. With regard to the relevant background art, reference is made to Unexamined German Laid-Open Patent Application DE 101 37 155.

The present invention also provides a method for controlling the optical power in a microscope, in particular, in confocal laser scanning microscope. According to the method, the optical power is measured using a measuring device, and a high-frequency and/or voltage source driving the acousto-optical or electro-optical element is controlled by a control unit as a function of the measured optical power in such a manner that the optical power reaches a selectable level.

Specifically, provision could be made for the high-frequency and/or voltage source to be controlled in such a manner that the optical power incident on the sample remains constant. This is particularly important when examining sensitive samples, i.e., to ensure that these samples are not damaged or even destroyed by excessive optical power. However, in special applications, it is also conceivable control the high-frequency and/or voltage source in such a manner that the optical power passes through a selectable profile.

As described above in connection with the device according to the present invention, the optical power could be measured in an intermediate image in a particularly simple manner. In the intermediate image, the measurement could be carried out, for example, on a frame-by-frame basis, which is useful especially in the case of long-term measurements. However, it would also be conceivable to carry out the measurement each time before an image is recorded. For optical power measurement, it is advantageous to measure the optical power in a spectrally selective manner so as to be able to control the optical power at the acousto-optical and electro-optical elements based on the measured values in a spectrally selective manner as well.

Generally, it would be possible to correct minor fluctuations of the optical power by changing the RF amplitude of the high-frequency source that drives the acousto-optical element while maintaining the RF frequency constant. Given appropriate initial conditions, this should be easily possible within a temperature range of $+/-1°$ C., in which the power change is less than 3%.

If, in the case of larger fluctuations of the optical power, control of the RF amplitude alone is not sufficient, it would be possible to record a complete intensity-frequency curve to thereby determine an optimum RF frequency of the high-frequency source driving the acousto-optical element. Given an appropriate control and use of suitable drivers, the optimum RF frequency can be determined in less than a second.

In the case of weak laser lines, variation of the RF amplitude is problematic because this amplitude should virtually always be set to 100%. In this case, it would be possible to correct the RF frequency as soon as an optical power loss of 1% is measured.

In the case of an AOBS used to spatially separate the illuminating light beam and the detection light beam, it has turned out to be advantageous to correct only the RF frequency because otherwise the excitation light component in the detection light beam is increased; it also being possible to, at least partially, compensate for this effect using a second downstream subcomponent of the AOBS.

Instead of using the illuminating light as a direct parameter, it is also conceivable to feed in an additional measuring beam whose power is always kept constant. This test beam could be provided, for example, by an IR laser diode. The light should not disturb the sample. The test beam could be guided through the AOTF, for example, aside the actual illuminating light or perpendicularly to the illuminating light. All RF frequencies are then simultaneously corrected analogously to the RF frequency of the test beam (according to a previously defined relationship).

BRIEF DESCRIPTION OF THE DRAWING

The present invention is elaborated upon below based on an exemplary embodiment with reference to the drawing, in which.

DETAILED DESCRIPTION

Figure 1:
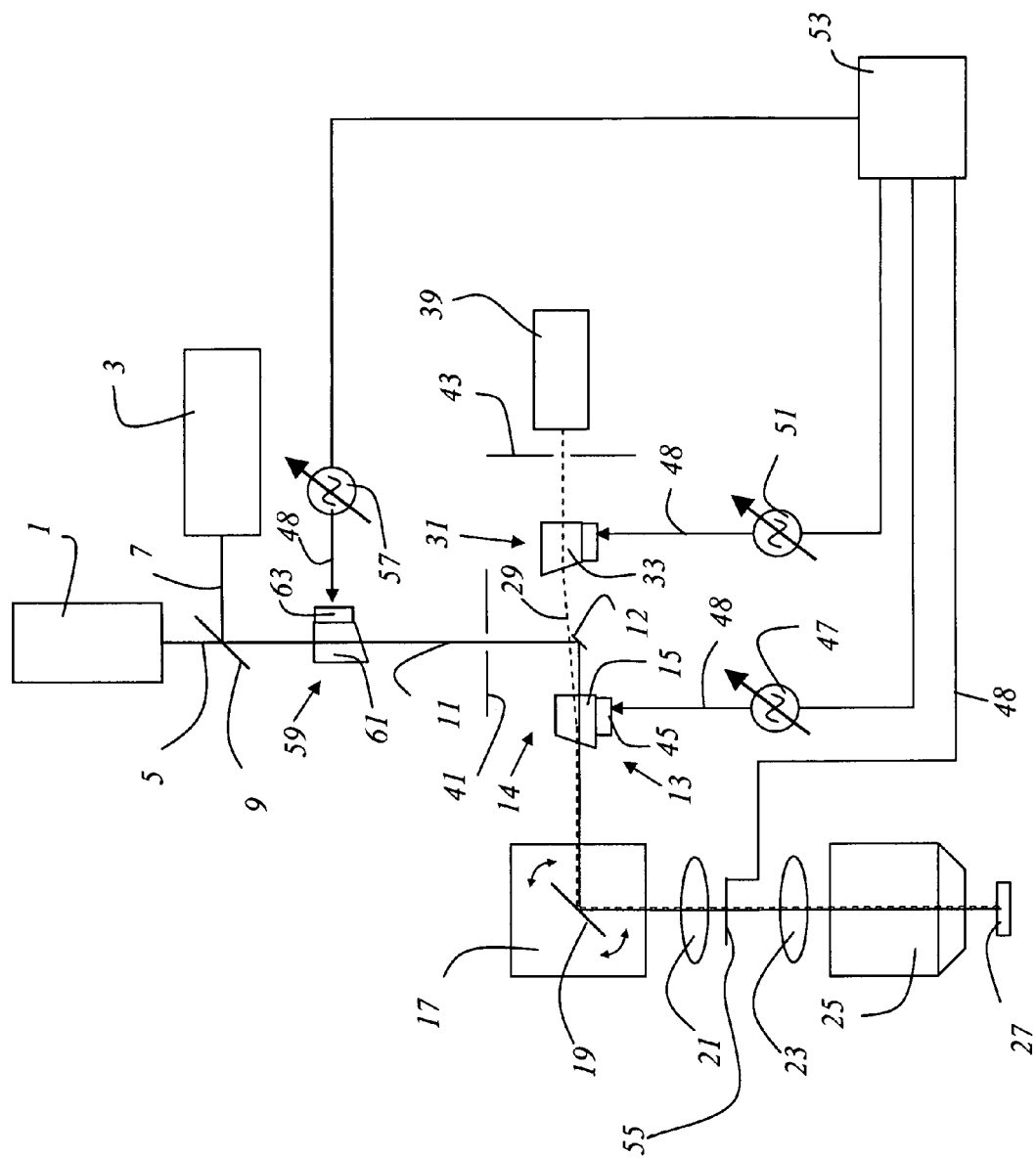
FIG. 1 shows a schematic representation of a device according to the present invention for controlling the optical power in a microscope, in particular, in a confocal laser scanning microscope.

FIG. 1 shows a device according to the present invention for controlling the optical power in a microscope, the microscope shown in the Figure being designed as a confocal scanning microscope. The microscope includes two lasers 1, 3 whose emitted light beams 5, 7 have different wavelengths and which are combined into an illumination beam path 11 by dichroic beam combiner 9. In addition, the microscope has an acousto-optical element 59, which is designed as an AOTF 61.

After passage through the AOTF 61, illumination beam path 11 proceeds to a deflection mirror 12 and from there to a further acousto-optical element 13, which is designed as an AOTF 15. From acousto-optical element 13, illumination beam path 11 reaches a beam deflection device 17 which contains a gimbal-mounted scanning mirror 19 and guides the illumination beam path 11 through scanning optical system 21, tube optical system 23, and lens 25 and across or through sample 27.

A measuring device 55 is placed between scanning optical system 21 and tube optical system 23 in the plane of the intermediate image, the measuring device having detection means for measuring the optical power and/or reference patterns in the form of a grating or lines for calibration.

The detection beam path 29 originating from the sample runs in the opposite direction through scanning optical system 21, tube optical system 23, and lens 25 and reaches acousto-optical element 13 via scanning mirror 19, the acousto-optical element 13 feeding detection light beam 29 to a further acousto-optical element 31, which is similarly designed as an AOTF 33 and used for spectral splitting. After passage through acousto-optical element 31, detection beam path 29 reaches detector 39, which is designed as a multiband detector.

In the drawing, illumination beam path 11 is represented as a solid line, and detection beam path 29 is shown as a dashed line. Illumination pinhole 41 and detection pinhole 43, which are usually provided in a confocal scanning microscope, are schematically drawn for the sake of completeness. By contrast, a number of optical elements for guiding and shaping the light beams have been omitted for the sake of improved clarity. They are sufficiently known to a one skilled in this field.

The acousto-optical element 59 used for selecting the selected wavelength components of illuminating light beam 11 is designed as an AOTF 61 which is traversed by an acoustic wave. The acoustic wave is generated by an electrically driven piezoelectric sound generator 63. Control is via a high-frequency source 57, the high-frequency electromagnetic wave being transmitted through a coaxial cable 48. The RF frequencies are selected such that only the selected wavelength components enter illumination beam path 11 and reach beam deflection device 17. The remaining components that are not affected by the acoustic excitation are blocked from illumination beam path 11. In this connection, the crystal cut and orientation of acousto-optical element 59 are selected such that, given the same input direction, different wavelengths are deflected in the same direction.

The power of the light of the desired wavelengths in illumination beam path 11 can be selected by varying the RF frequency and/or the RF amplitude of the acoustic wave as a function of the optical power detected by measuring device 55. If the measured optical power deviates from the desired optical power, then high-frequency source 57 is controlled via a control unit 53 in such a manner that the optical power reaches the desired level again. This procedure can be carried out in a color-selective fashion for the laser wavelengths contained in the illuminating light beam.

AOBS 14 is composed of the two further acousto-optical elements 13 and 31, which are designed as an AOTF 15 and 33, and driven by a further high-frequency source 47 and 51, respectively. In this connection, the RF frequencies are selected, for example, such that the detection light components in detection beam path 29 that have the wavelength of the illuminating light are blocked. Acousto-optical element 13 is essentially used to separate the illuminating light beam and the detection light beam. After passage through AOTF 15, the detection light beam has undergone both spectral and polarization-dependent splitting. Acousto-optical element 31 is essentially used to compensate for the spectral and polarization-dependent splitting. Both acousto-optical elements 13 and 31 can be controlled independently as a function of the optical power detected by measuring device 55.

Finally, it should be noted that the exemplary embodiment discussed above serves to illustrate the claimed teaching without limiting it to the exemplary embodiment.

LIST OF REFERENCE NUMERALS 1 laser
3 laser
5 emitted light beam
7 emitted light beam
9 beam combiner
11 illumination beam path
12 deflection mirror
13 acousto-optical element
14 AOBS
15 AOTF
17 beam deflection device
19 scanning mirror
21 scanning optical system
23 tube optical system
25 lens
27 sample
29 detection beam path
31 acousto-optical element
33 AOTF
39 detector
41 illumination pinhole
43 detection pinhole
45 piezoelectric sound generator
47 high-frequency and/or voltage source
48 coaxial cable
51 high-frequency and/or voltage source
53 control unit
55 measuring device
57 high-frequency and/or voltage source
59 acousto-optical element

What is claimed is:

1. An apparatus for controlling optical power in a microscope, the microscope including:
   at least one light source configured to provide light along an illumination beam path to a sample;
   a detector configured to receive detection light lead along a detection beam path from the sample; and
   an acousto-optical or electro-optical element disposed in the illumination beam path and configured to be driven by a high-frequency source;

the apparatus comprising:

a measuring device configured to measure the optical power of an illuminating light beam, wherein the measuring device is disposed in the illumination beam path; and a control unit configured to control the high-frequency source as a function of the measured optical power so as to achieve a selectable level of the optical power.

2. The apparatus as recited in claim 1 wherein the microscope includes a confocal laser scanning microscope.

3. The apparatus as recited in claim 1 wherein the high-frequency source includes a voltage source.

4. The apparatus as recited in claim 1 wherein the measuring device is disposed between a scanning optical system and a tube optical system in a plane of an intermediate image of the microscope.

5. The apparatus as recited in claim 1 wherein the measuring device is disposed directly upstream of the sample.

6. The apparatus as recited in claim 1 wherein the measuring device is disposed downstream of the sample.

7. The apparatus as recited in claim 1 wherein the measuring device is disposed in the detection beam path.

8. The apparatus as recited in claim 1 wherein the measuring device includes a detection device configured to measure optical power.

9. The apparatus as recited in claim 8 wherein the detection device includes at least one of a photodiode and a monitoring diode.

10. The apparatus as recited in claim 1 wherein the measuring device includes at least one reference pattern.

11. The apparatus as recited in claim 1 further comprising an optical reflecting device configured to reflect out a reference beam.

12. The apparatus as recited in claim 11 wherein the optical reflecting device is configured to permanently reflect out the reference beam.

13. The apparatus as recited in claim 1 wherein the acousto-optical or electro-optical element is disposed in the illumination beam path downstream of a beam combiner.

14. The apparatus as recited in claim 1 wherein the acousto-optical element includes an acousto-optical tunable filter.

15. The apparatus as recited in claim 1 wherein the acousto-optical element includes an acousto-optical beam splitter.

16. The apparatus as recited in claim 1 wherein the acousto-optical element includes an acousto-optical modulator.

17. The apparatus as recited in claim 1 wherein the electro-optical element includes an electro-optical modulator.

18. The apparatus as recited in claim 1 wherein at least one of an RF frequency and an RF amplitude of the high-frequency source is adjustable in a nearly infinitely variable manner.

19. The apparatus as recited in claim 1 further comprising at least one further acousto-optical or electro-optical element controllable as a function of the measured optical power.

20. A method for controlling optical power in a microscope, comprising:

measuring the optical power of an illuminating light beam using a measuring device, wherein the measuring device is disposed in an illumination beam path;

driving an acousto-optical or electro-optical element of the microscope using a high-frequency source; and controlling the high-frequency source using a control unit, the controlling being performed as a function of the measured optical power so as to achieve a selectable level of the optical power.

21. The method as recited in claim 20 wherein the microscope includes a confocal laser scanning microscope.

22. The method as recited in claim 20 wherein the microscope includes:

at least one light source configured to provide light along an illumination beam path to a sample; and a detector configured to receive detection light lead along a detection beam path from the sample.

23. The method as recited in claim 22 wherein the acousto-optical or electro-optical element is disposed in the illumination beam path.

24. The method as recited in claim 20 wherein the high-frequency source includes a voltage source.

25. The method as recited in claim 20 wherein the controlling is performed so that the optical power remains constant.

26. The method as recited in claim 20 wherein the controlling is performed so that the optical power passes through a selectable profile.

27. The method as recited in claim 20 wherein the measuring is performed by measuring the optical power in an intermediate image.

28. The method as recited in claim 27 wherein the measuring is performed by measuring the optical power in the intermediate image on a frame-by-frame basis.

29. The method as recited in claim 20 wherein the measuring is performed by measuring the optical power each time before an image is recorded.

30. The method as recited in claim 20 wherein the measuring is performed by measuring the optical power in a reference beam that is permanently reflected out.

31. The method as recited in claim 20 wherein the measuring is performed by measuring the optical power in a spectrally selective manner.

32. The method as recited in claim 20 further comprising correcting minor fluctuations of the optical power by changing an RF amplitude of the high-frequency source.

33. The method as recited in claim 20 further comprising, upon larger fluctuations of the optical power, recording a complete intensity-frequency curve so as to determine an optimum RF frequency of the high-frequency source.

34. The method as recited in claim 20 wherein the controlling is performed by correcting, upon an occurrence of weak laser lines, an RF frequency of the high-frequency source when an optical power loss of the laser line is 1%.

35. The method as recited in claim 20 wherein:

the microscope further includes an acousto-optical beam splitter disposed in a detection beam path; and wherein the controlling is performed by correcting an RF frequency of the high-frequency source at the acousto-optical beam splitter.

* * * * *